US005635704A

United States Patent [19]
Del Signore, II et al.

[11] Patent Number: 5,635,704
[45] Date of Patent: Jun. 3, 1997

[54] SELF-ADJUSTING OPTICAL SENSING SYSTEM FOR FINANCIAL AND RETAIL PRINTERS

[75] Inventors: James R. Del Signore, II, Trumansburg; Andrew B. Nye, III, Lansing, both of N.Y.

[73] Assignee: NCR Corporation, Dayton, Ohio

[21] Appl. No.: 548,124

[22] Filed: Oct. 25, 1995

[51] Int. Cl.[6] .......... G01J 1/32
[52] U.S. Cl. .......... 250/205; 250/559.1; 83/370
[58] Field of Search .......... 250/205, 206, 250/559.1, 559.18, 559.44, 548; 400/225, 579; 83/371, 210, 369, 370

[56] References Cited

U.S. PATENT DOCUMENTS

| | | | |
|---|---|---|---|
| 3,439,176 | 4/1969 | Astley et al. . | |
| 3,922,539 | 11/1975 | Carnes et al. | 250/559.44 |
| 4,147,080 | 4/1979 | Diesch et al. | 83/371 |
| 4,161,899 | 7/1979 | Strunc | 83/371 |
| 4,531,851 | 7/1985 | Kondo et al. | 400/583.3 |
| 4,554,460 | 11/1985 | Klein | 250/208.1 |
| 4,719,575 | 1/1988 | Gnuechtel | 250/559.3 |
| 4,866,425 | 9/1989 | Lindmark | 340/556 |
| 5,084,626 | 1/1992 | Dragon et al. | 250/548 |
| 5,400,664 | 3/1995 | Kio | 250/565 |

*Primary Examiner*—Que Le
*Attorney, Agent, or Firm*—Mark Levy

[57] ABSTRACT

This invention features a sensing system and a method for dispensing financial and retail receipts from a receipt-printing machine. The sensing system of this invention can use any one of a myriad of typical supply rolls having a media strip (usually paper) that has black marks periodically located at given intervals along its edge. The sensing system usually has a light-emitting diode (LED) and a photo-transistor. The light from the LED is directed on the supply roll, where, as the paper is advanced, it is reflected to the photo-transistor. When a black mark comes into the range of the LED, the light from the LED is absorbed and not reflected to the photo-transistor. The printing machine then stops advancing the paper, and cuts it to form a receipt of adequate length. The invention utilizes a microprocessor that has a pulse width modulator (PWM) for providing a square wave output to a digital-to-analog (D/A) converter. A program of the microprocessor controls the frequency and the duty cycle of the PWM. The D/A converter changes the square wave to a direct current (DC) voltage, and an exact relationship between the PWM duty cycle and the current level flowing in the LED is thus established. The system is a self-adjusting one, due to an analog-to-digital (A/D) converter in the microprocessor. This allows for the automatic calibration of the system.

16 Claims, 7 Drawing Sheets

SENSOR CATHODE CURRENT VS DUTY CYCLE

SELF-ADJUSTING OPTICAL SENSING SYSTEM FOR FINANCIAL AND RETAIL PRINTERS

FIELD OF THE INVENTION

The present invention pertains to a sensing system for retail and financial printers and, more particularly, to a self-adjusting optical sensing system for dispensing paper receipts in a retail or financial printer that prints, advances and dispenses a financial receipt. The length of each dispensed, printed receipt is determined by the printer's optical detection of black-mark locators that are periodically disposed along the edge of the paper supply roll.

BACKGROUND OF THE INVENTION

A financial printer, such as that used in banks' automatic teller machines (ATMs), uses a roll of supply paper for dispensing receipts to customers. These paper supply rolls are periodically marked on one edge thereof with black marks. These black marks define the length of the printed receipt that is dispensed to the banking customer. Optical sensors in the printing system detect the black marks, and generate signals to instruct the cutting mechanism to cut the paper to the appropriate receipt length.

Despite the fact that the sensing and dispensing systems of ATMs are fairly simple in their concept, the machines' lack of reliability and repeatability in achieving adequate receipt lengths is problematical. One of the major causes of this problem is the fact that banks use paper rolls from different manufacturers and supply vendors; hence, they are not manufactured according to a set standard. The optical characteristics thereof thus have a wide tolerance variation, i.e., the surface and the black markings of these different papers each have their own optical properties of reflectivity and light absorption, depending on the manufacturer.

Typically, state-of-the-art sensing systems in printing machines use optical devices consisting of an infrared light-emitting diode (LED) with a focused, major axis beam. The beam is reflected from the rolled paper into a photo-sensitive device, such as a photo-transistor. The reflectivity from the white surface of the paper excites the base of the transistor, allowing it to conduct current. While the transistor is conducting, the dispensing mechanism continues to advance the paper. The advancement of the paper ceases when the transistor current falls to a level that indicates that a black mark has come into the range of the LED. When this occurs, the infrared, major axis beam of the LED is absorbed by the black mark; thus, the light is not reflected back towards the photo-transistor, and the transistor ceases to conduct current at a level that is associated with white paper.

Also contributing to the problem concerning reliability and repeatability are: production tolerances associated with optical sensors; the length of the gap between the paper and the LED; the length of the gap between the paper and the sensor; LED light output variations; photo-transistor sensitivity variations; and circuitry parameters.

One of the objectives of this invention is to fabricate an improved sensing and dispensing system for financial and retail receipts that is reliable and repeatable, despite any variation in optical characteristics of paper supply rolls.

Another objective of the invention is to automate the calibration process of retail and financial printers, whereby the system becomes self-adjusting and thus eliminates manual adjustments.

Still another objective of this invention is to provide an optical system that is fabricated from inexpensive components, ones that can adapt to a wide variation in optical characteristics of the supply roll media.

The present invention provides for a simplified, self-adjusting and easily calibrated optical sensing system for providing a printed receipt from a financial or retail printing device.

The current invention eliminates the need, prior to the calibration process, to accurately position a black mark on a supply roll in the range of an optical sensor.

The improved optical sensing system of this invention adjusts for different ambient lighting conditions, component variations and tolerances, as well as optical characteristics of black marks and varying supply roll media.

The sensing system of this invention eliminates or greatly reduces variations in the optical sensing due to dust build-up.

The optical sensing system of this invention eliminates the need for special tools or requisite adjustments to conform or adjust the optical characteristics of the black marks or the paper reflectivity qualities to the optical sensing system.

SUMMARY OF THE INVENTION

In accordance with the present invention, there are provided a sensing system and a method for dispensing financial and retail receipts from a receipt-printing machine. The sensing system of this invention can use any one of a myriad of typical supply rolls comprising a media strip (usually paper) that has black marks periodically disposed at given intervals along its edge. The sensing system typically comprises a light-emitting diode (LED) and a photo-transistor. The light from the LED is directed on the supply roll, where, as the paper is advanced, it is reflected to the photo-transistor. When a black mark comes into the range of the LED, the light from the LED is then absorbed and not reflected to the photo-transistor. The printing machine then stops advancing the paper, and cuts it to form a receipt of adequate length.

The invention utilizes a microprocessor that has a pulse width modulator (PWM) incorporated therein for providing a square wave output to a digital-to-analog (D/A) converter. A program of the microprocessor controls the frequency and duty cycle of the PWM. The D/A converter changes the square wave to a direct current (DC) voltage. An exact relationship between the PWM duty cycle and the current level flowing in the LED is thus established. The amount of light flux emitted by the LED is determined by the current flowing through it. When this light is reflected off the media strip (e.g., paper), the light flux affects the collector current of a photo-transistor. The photo-collector current is applied to an analog-to-digital (A/D) converter. The signal from the A/D converter is used to inform the microprocessor of the presence or absence of a black mark. The signal from the A/D converter is utilized by the microprocessor to deactivate the paper advancement mechanism and to activate the paper cutter. The system is a self-adjusting one, due to the relationship between the A/D converter signal and the microprocessor control of the duty cycle; this relationship allows for the automatic calibration thereof.

In order to determine the value which must be written to the D/A converter for achieving a reliable signal level at the A/D converter, the sensing system method of the invention comprises the steps of: (1) assuming that the photo-sensor is seeing white paper, and iteratively increasing the signal fed to the D/A converter, while measuring the voltage output at the A/D converter; (2) determining whether the signal at the D/A converter has reached a maximum value before the voltage output of the A/D converter has reached a given, predetermined threshold value; and (3) if the D/A converter signal has reached a maximum value before the voltage output of the A/D converter has reached the threshold value, then choosing another threshold value for the A/D converter that is representative of a reliable white-paper signal. The process is repeated until a reliable D/A signal can be obtained. After the successful determination of both the ambient voltage and the D/A signal in the calibration procedure, the microprocessor is able to control the paper-feeding operation, bringing a black mark under the sensor, and, hence, determining an appropriate receipt length. When this is accomplished, the pertinent calibration values are stored in memory. The inventive system automatically adjusts the calibration values to the particular optical characteristics of any paper supply roll.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a sensing system and a method for controlling the printing of a receipt from a retail or financial printing machine, such as a bank's ATM. The use of different supply rolls having different optical characteristics has presented problems of reliability vis-a-vis the optical sensor's detection of adequate paper length for receipts. Due to the changing optical characteristics of the media (paper), the machines often fail to properly sense the movement of the media during the printing of the receipts. These fluctuating changes have thus necessitated the need for a sensing system that is self-adjusting and easily calibrated. Applicants' inventive system automatically calibrates the optical sensing in accordance with any changes in the supply roll optics.

Figure 1:
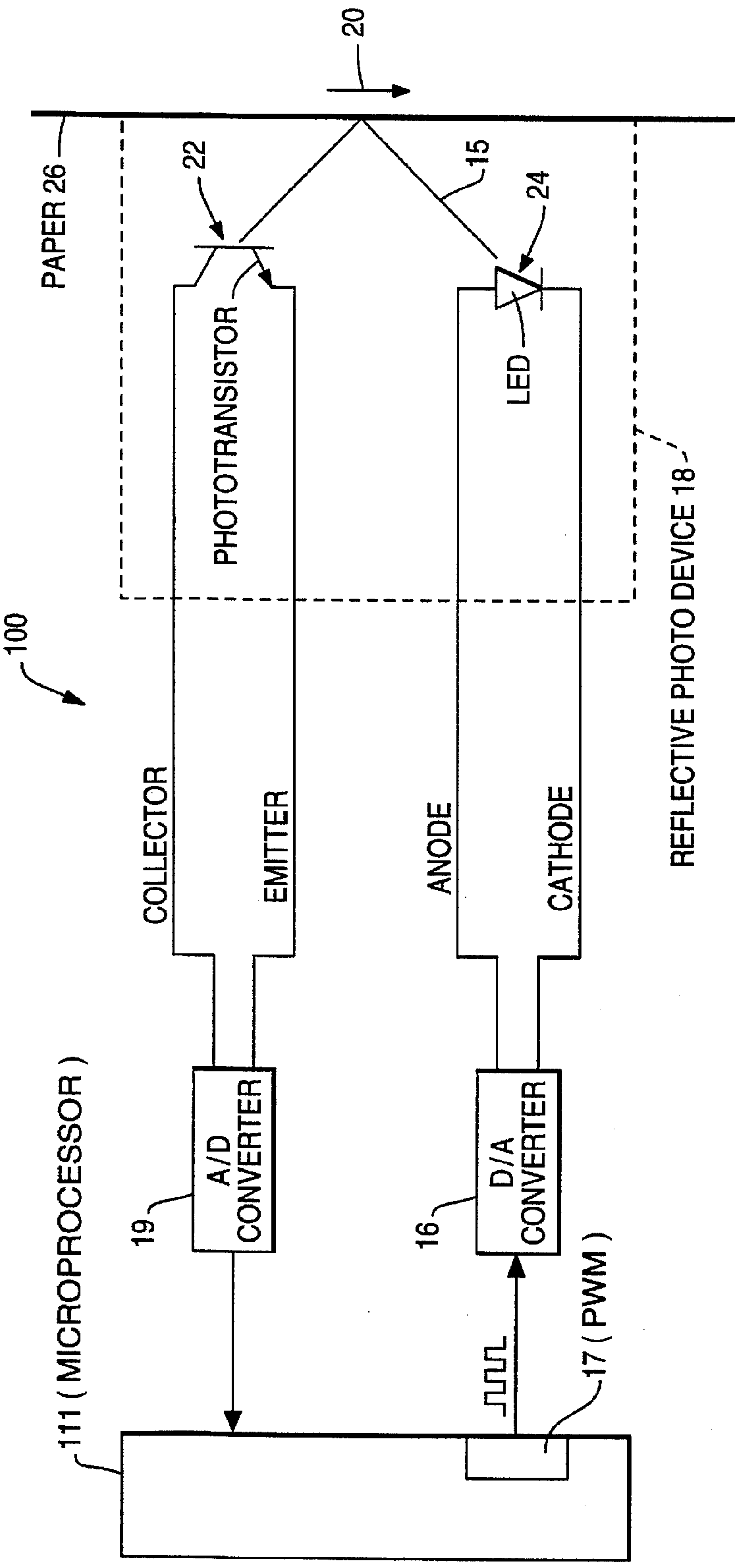
FIG. 1 illustrates a block diagram of the self-adjusting, black-mark sensing system of this invention.
Figure 1A:
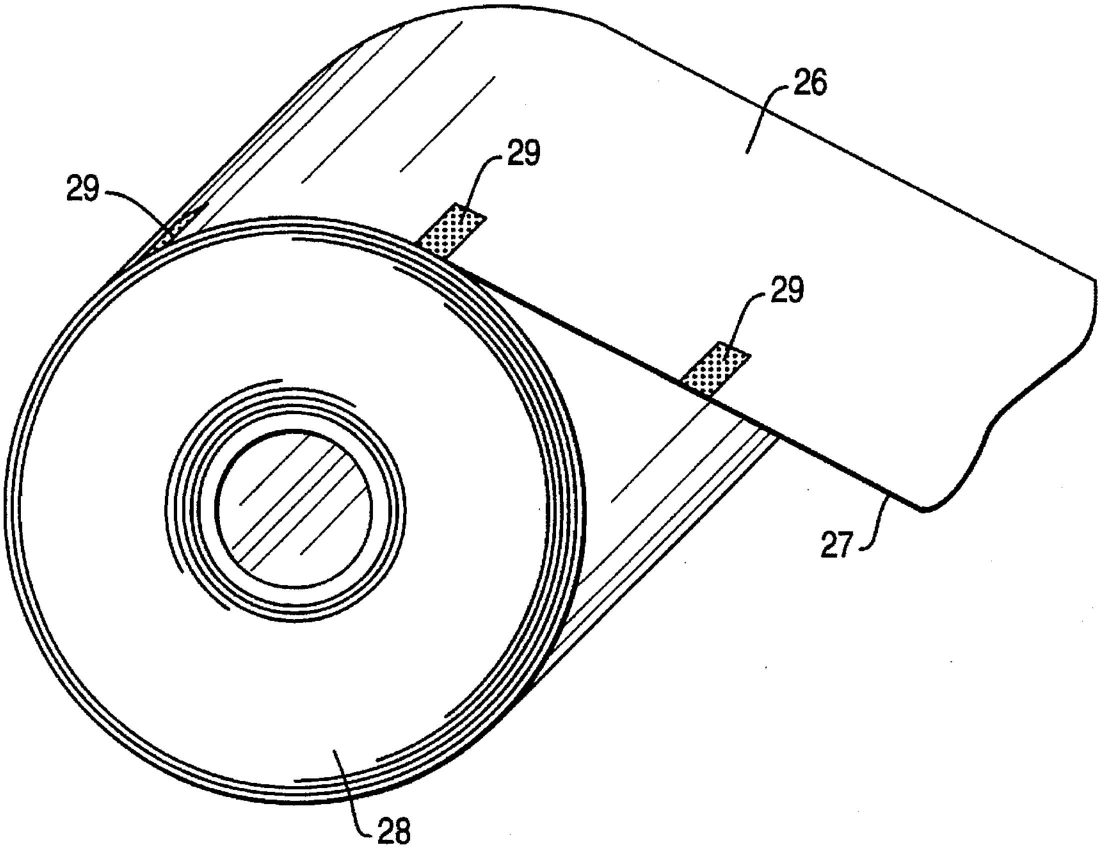
FIG. 1*a* shows a perspective view of a typical supply roll of paper used for printing a receipt in a financial or retail printer.

Now referring to FIGS. 1 and 1*a*, a block diagram of the self-adjusting black-mark, optical sensing system 100 of this invention and a paper supply roll 28 are shown. The system 100 (FIG. 1) comprises a microprocessor 111 that determines when one of a plurality of black marks 29 passes (arrow 20) in front of a photo-reflective device 18. The black marks 29 (FIG. 1*a*) are periodically disposed along an edge 27 of a media strip 26 that is fed from the supply roll 28. The photo-reflective device 18 comprises a light-emitting diode (LED) 24 and a photo-transistor 22. The light beam 15 emitted from the LED 24 is reflected from the edge 27 of the media strip 26 to the photo-transistor 22 only when no black mark 29 is present adjacent the photo-transistor 22; the light energy is thus otherwise absorbed.

The microprocessor 111 includes an integral pulse width modulator (PWM) 17 that is incorporated therein for providing a square wave output to a digital-to-analog (D/A) converter 16. A program of the microprocessor 111 controls the frequency and the duty cycle of the PWM.

The D/A converter 16 changes the square wave to a direct current (DC) voltage. An exact relationship between the PWM duty cycle and the current level flowing in the LED 24 is thus established. The amount of light flux emitted by the LED 24 is determined by the current flowing through it. When the light beam 15 is reflected off the media strip (paper) 26, the light flux affects the collector current of a photo-transistor 22. The photo collector current is introduced to an analog-to-digital (A/D) converter 19. The signal from the A/D converter 19 is used to inform the microprocessor 111 of the presence or absence of a black mark 29. The signal from the A/D converter 19 is utilized by the microprocessor 111 to deactivate the paper advancement mechanism (not shown), and to activate the cutter mechanism (not shown) of the printer (not shown). The system is self-adjusting through the utilization of the relationship between the A/D converter signal and the microprocessor control of the duty cycle, the control of which is contained within the routines of the microprocessor program.

Figure 2:
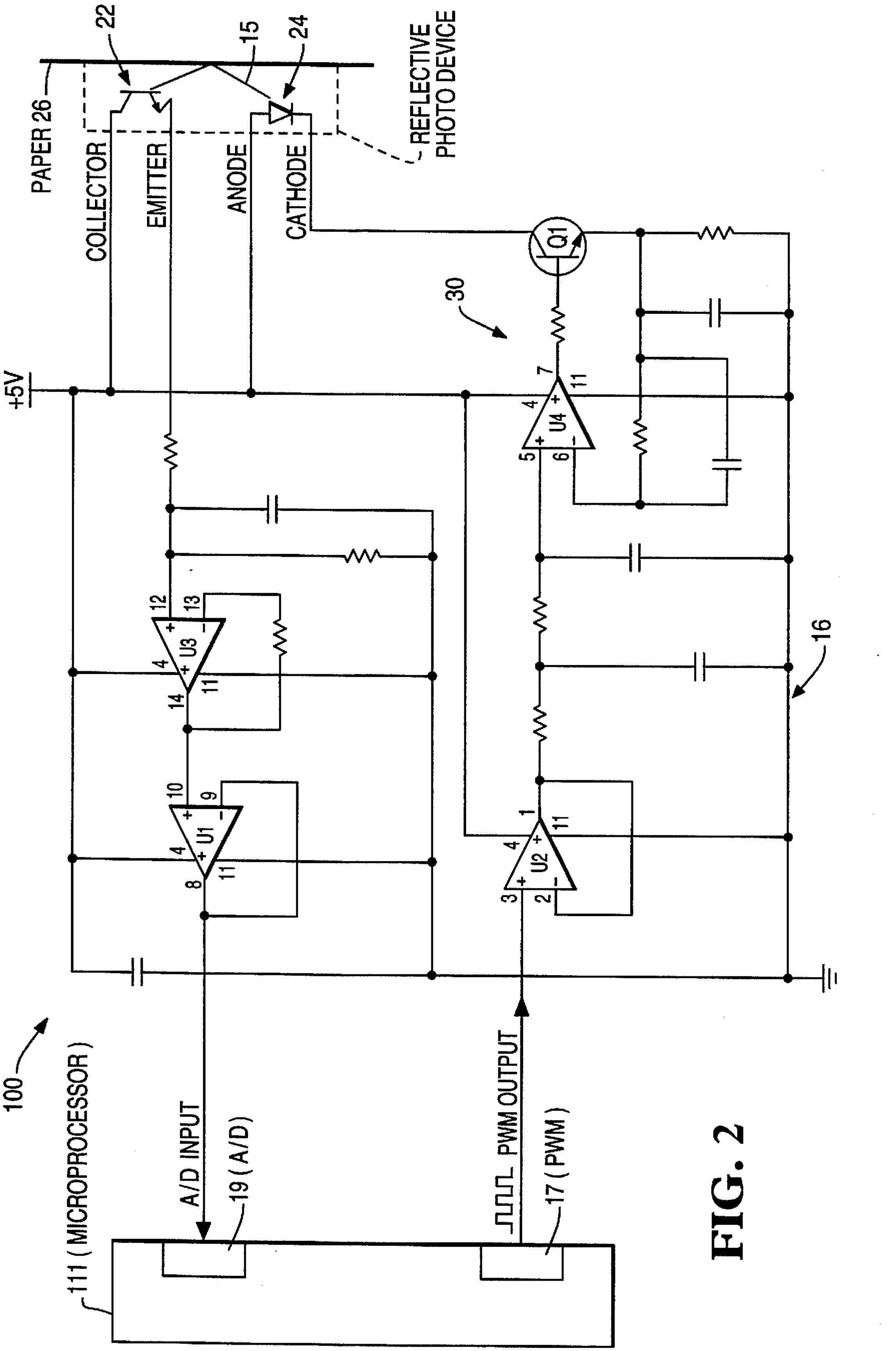
FIG. 2 depicts a schematic diagram of the circuitry that forms part of the sensing system shown in FIG. 1.

Referring to FIG. 2, a detailed schematic diagram is shown of the system 100 illustrated in FIG. 1. The microprocessor 111 is a state-of-the-art device, such as a Model No. 80C552 processor, manufactured by the Philips Corporation. The microprocessor 111 incorporates a PWM 17, as aforementioned, and an A/D converter 19. Voltage follower buffers/operational amplifiers U1 and U3 and resistors R2, R4 and R5 are connected as shown. The D/A converter 16 consists of operational amplifiers U2 and U4; resistors R1, R3, R6, R7 and R8; and capacitors C2, C4, C5 and C6.

The frequency of the square wave and the duty cycle of the PWM 17 are controlled by the microprocessor program. The square wave output of the PWM 17 drives the operational amplifier U2, which is configured as a voltage follower. The output of the operational amplifier U2 at pin 1 drives a two-stage RC filter, comprising R1 and C2 (first stage), and R3 and C4 (second stage). The RC filters convert the square wave of the PWM 17 to a DC voltage, and present the DC voltage to a transresistance amplifier 30 consisting of operational amplifier U4; transistor Q1; capacitors C5 and C6; and resistors R6, R7 and R8.

As the duty cycle of the PWM 17 output is changed, the DC voltage level presented to the pin 5 of the operational amplifier U4 is also changed. The output of the operational amplifier U4 controls the base current of the transistor Q1 and the consequent collector current in resistor R8. This current also flows through the LED 24. The voltage drop across resistor R8 is negatively fed back to the operational amplifier U4 input at pin 6. The transresistance amplifier circuitry 30 attains an equilibrium state when the current in resistor R8 indicates a voltage drop with a value at pin 6 of the operational amplifier U4 equalling the converted DC voltage value at pin 5. This establishes the direct relationship between the PWM 17 duty cycle and the current level flowing in the LED 24. The resistor R6 and the capacitors C5 and C6 form filters that reduce the ambient electrical noise sensitivity of the transresistance amplifier circuitry 30.

The light flux of the emitted light beam 15 from the LED 24 is determined by the current flowing through it. The photo-collector current generated by the photo-transistor 22 is influenced by the light flux. The photo-collector current flows through the divider network comprising resistors R4 and R5. These resistors have the same value, and the voltage at pin 12 of the operational amplifier U3 is approximately one-half of that produced at the emitter of photo-transistor 22. The signal is divided so as to remain within a range of 0 to 2.5 volts, which guarantees that the common mode voltage range of the operational amplifier U3 voltage follower operates on a 0 to +5 volt supply.

The operational amplifier U1 is an additional analog buffer that provides input voltage to the A/D converter 19. The A/D converter 19 of microprocessor 111 converts the voltage level output at pin 8 of the operational amplifier U1 to a digital count for microprocessor program use. The capacitor C3 and resistor R5 provide filtering capability to reduce ambient electrical noise sensitivity. Capacitor C1 is a bypass capacitor for the gates of operational amplifiers U1, U2, U3 and U4.

Operation of the System

The calibration of the system 100 must of necessity precede the detection of the black marks 29. The calibration procedure is actually two separate procedures, the first of which is described with reference to FIG. 3*a*, and the second of which with respect to FIG. 3*b*. The first procedure involves the nullification of ambient light effects upon the system 100. The second procedure describes the actual calibration procedure.

Figure 3A:
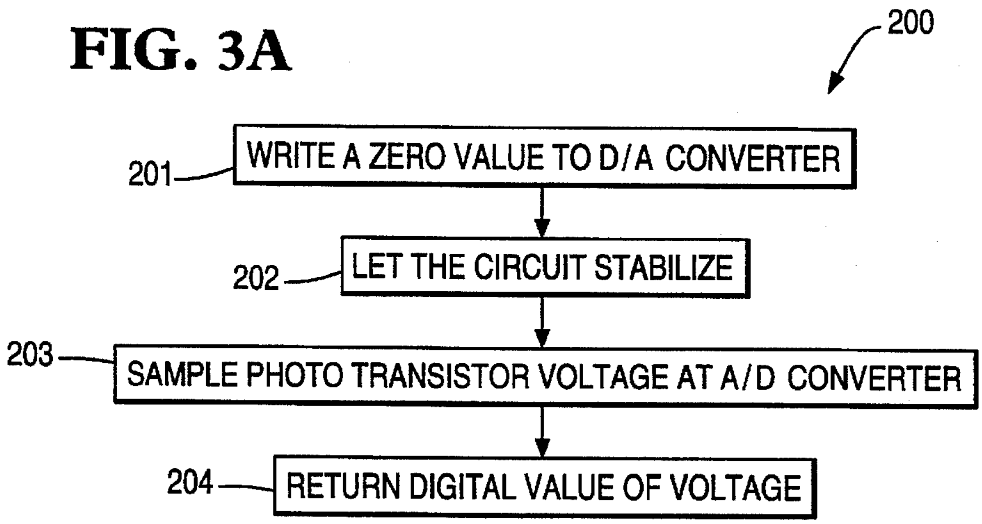
FIGS. 3*a* and 3*b* show respective flowcharts of a method used to calibrate the sensing system of this invention in accordance with FIGS. 1 and 2.
Figure 3B:
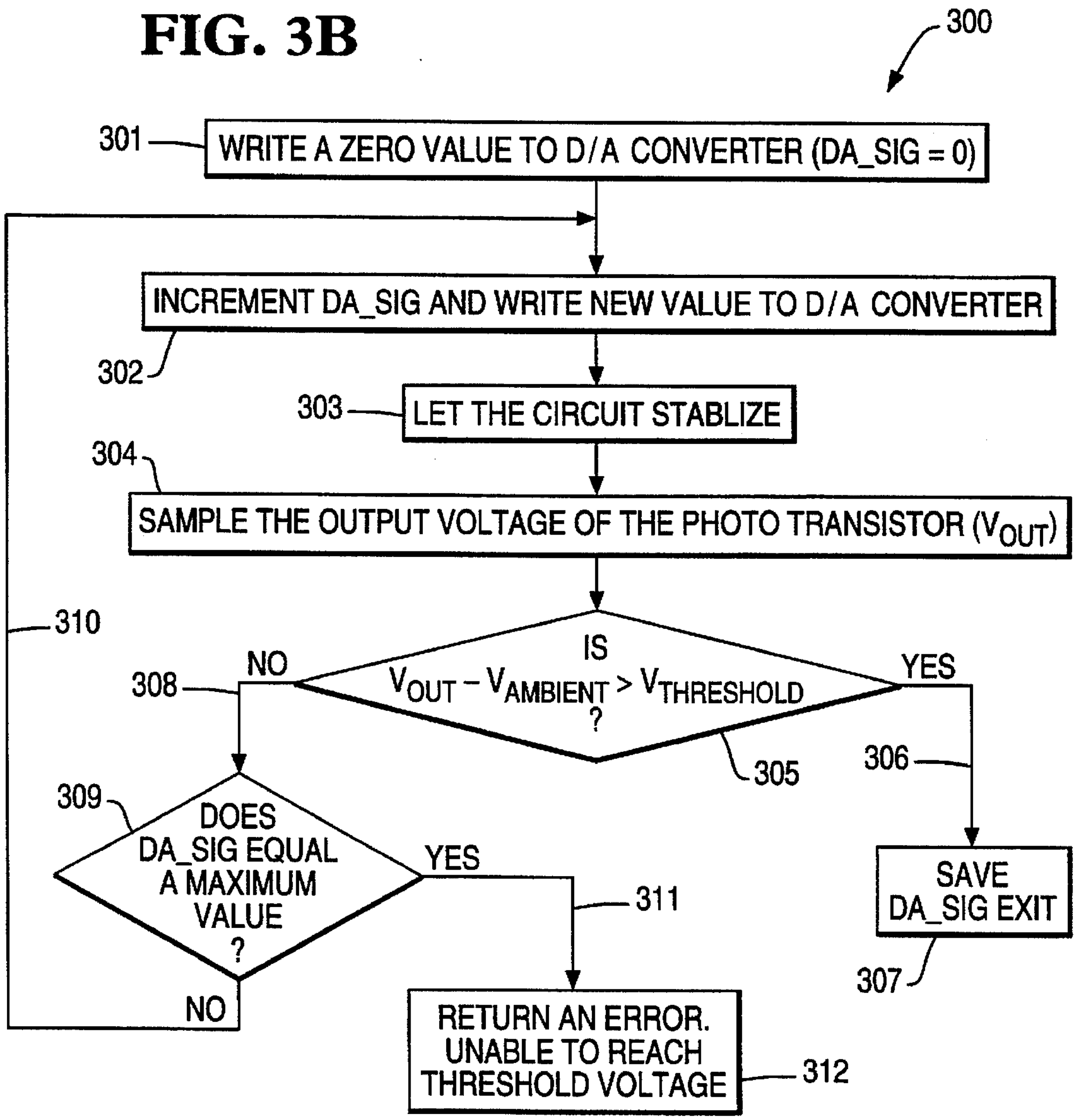

Referring to FIG. 3*a*, a flowchart 200 of the nullification of the ambient light affecting the system is illustrated. The digital-to-analog converter 16 is first fed a zero value, step 201. The system 100 (FIG. 2) is then allowed to stablilize, step 202. The voltage of the photo-transistor 22, as measured at the A/D converter 19, is then sampled by turning off the LED 24, step 203. This determines the ambient light effect upon the A/D converter 19. This value is then nulled while determining the voltage threshold value of the D/A converter 16 that provides proper black-mark sensing, step 305 (FIG. 3*b*). The voltage due to ambient light, $V_{ambient}$, is fed to the routine illustrated in FIG. 3*b*, via step 204.

Referring to FIG. 3*b*, the automatic calibration procedure of this invention is shown in flowchart 300. The calibration routine 300 is an iterative process. The method first assumes that the photo-transistor 22 is viewing the white-paper portion of the media strip 26, which will result in there being a zero value in the D/A converter 16, i.e., the signal DA_SIG=0, step 301. The routine then starts increasing this value by single incremental steps, step 302. The circuit 100 is allowed to stabilize, step 303. In step 304, the output voltage of the photo-transistor 22 is sampled by taking a voltage measurement $V_{out}$ at the A/D converter 19. The iterative process continues until $V_{out}$ is above a predetermined threshold value, $V_{threshold}$, step 305. The ambient voltage value, $V_{ambient}$, is subtracted from $V_{out}$ when making this calculation. When the iteration is at a point where $V_{out}$ is not greater than $V_{threshold}$, step 309 is performed via line 308. If the DA_SIG is not at a maximum value, the process is repeated by repeating step 302 via line 310. However, if $V_{out}$ reaches the threshold voltage value, $V_{threshold}$, and DA_SIG is at maximum, then an error is indicated, whereby the system is unable to reach a threshold voltage via line 311 to step 312. When the $V_{out}$ reaches the threshold voltage, $V_{threshold}$, step 305, the value of DA_SIG is the calibration voltage, which is stored in computer memory by performing step 307 via line 306. The routine is then exited.

Figure 4A:
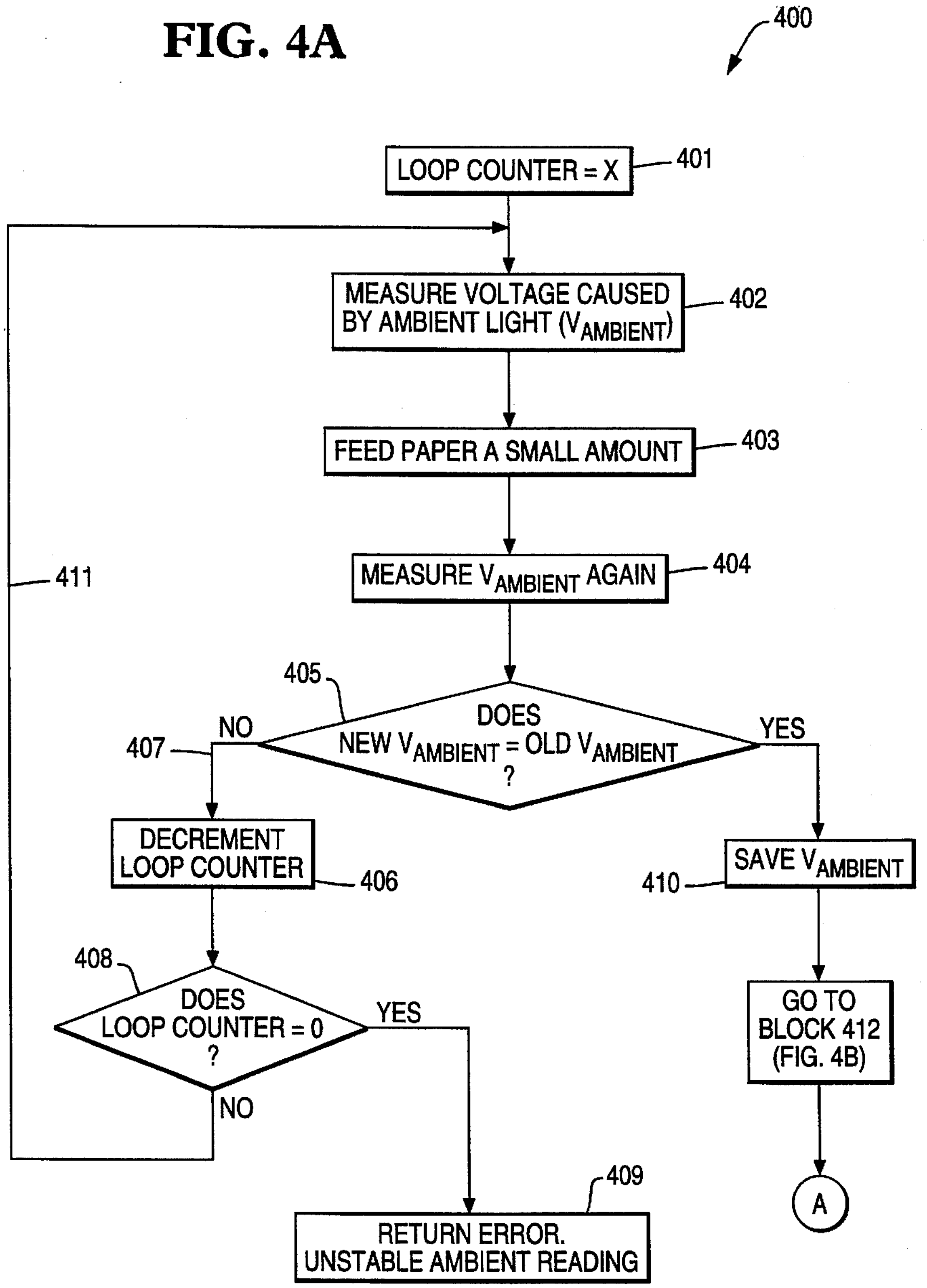
FIGS. 4*a* and 4*b* illustrate a flowchart of the method used to feed a receipt from a financial or retail printing machine, in accordance with the sensing system depicted in FIGS. 1 and 2, and the calibration method depicted in FIGS. 3*a* and 3*b*.
Figure 4B:
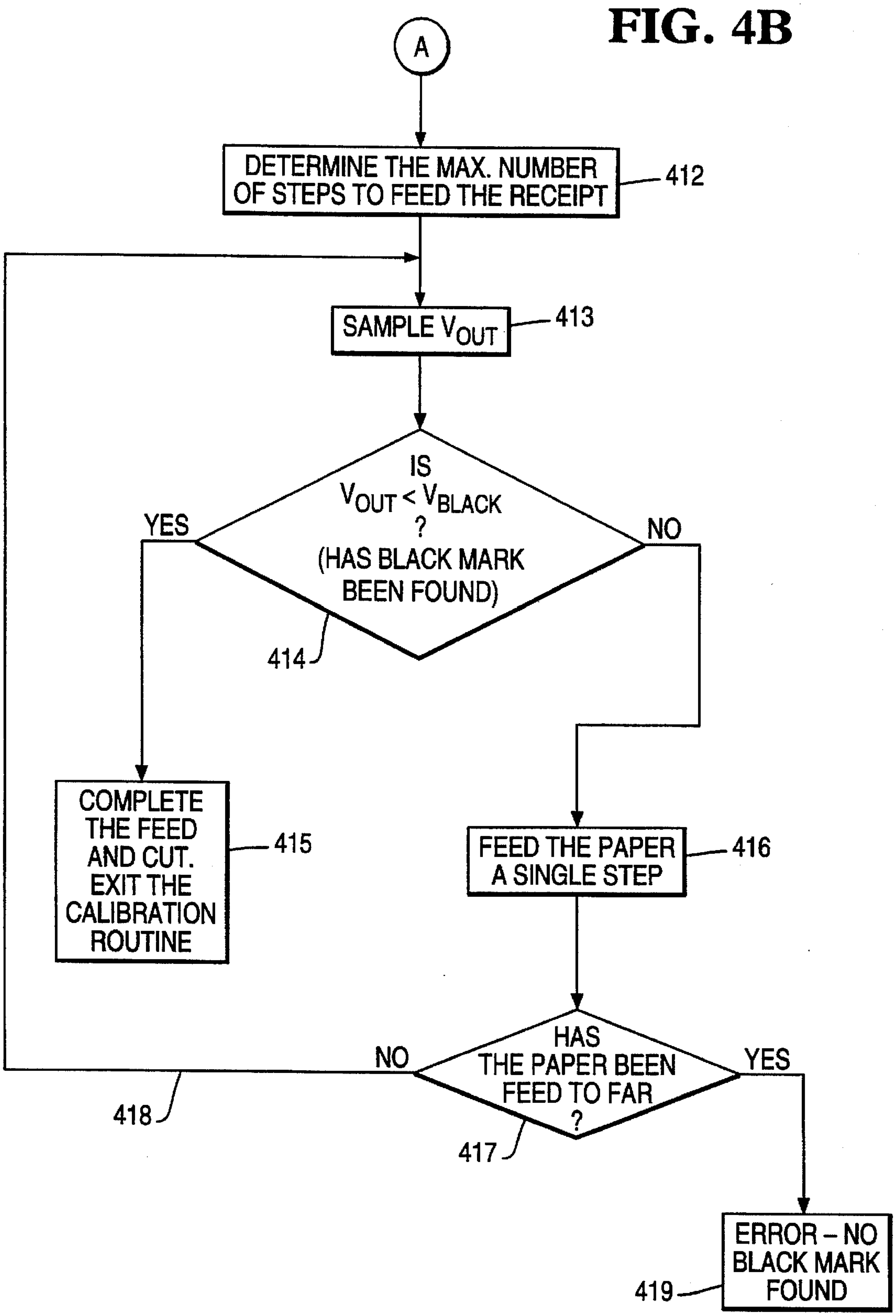

Referring to FIGS. 4*a* and 4*b*, the flowchart 400 details the physical procedure of the paper advancement and voltage measurement, when the system 100 (FIG. 1) is initialized before calibration and use. The printer (not shown) has a number of loop counters that check the advancement of the paper strip 26 through the printer. Before calibration begins, the microprocessor 111 does not know whether there is a black mark 29 under photo-transistor 22. It also has no way of knowing whether a black mark 29 has moved under the photo-transistor 22, after the advancement mechanism of the printer has moved the paper strip 26 a small increment during calibration. Therefore, loop counters are employed to double-check the results of the calibration procedure and remove any errors caused by black marks 29 that may be misinterpreted as white-paper.

Starting with step 401 (FIG. 4*a*), a decrement value, X, is selected. The decrement value X is usually equal to or less than 4. The voltage $V_{ambient}$ is measured, step 402. The paper is then advanced a small increment, step 403. The voltage $V_{ambient}$ is again measured, step 404. The system determines, step 405, whether the new ambient voltage, step 404, equals the previous ambient voltage, step 402. If it does not, step 406 is performed via line 407. Once the loop counter is decremented, step 406, the system determines, step 408, whether the loop counter has been decremented to zero. If it has, then the routine returns an error message indicating that the ambient reading is unstable, step 409. If the loop counter has not been decremented to zero, the routine repeats step 402 via loop 411. When the new ambient reading is the same as the previous ambient reading, step 410, the $V_{ambient}$ value is saved in computer memory.

Step 412 (FIG. 4*b*) requires that the maximum number of incremental steps to feed a full receipt be implemented. This number is the actual count of the increments needed to bring a black mark 29 under the photo-transistor 22. Step 413 samples $V_{out}$, which is the actual voltage measured by the sensing system for the black mark 29, which is now adjacently positioned thereunder. The system has chosen a predetermined value for the black mark, $V_{black}$. If the assigned value, $V_{black}$, is greater than the sensed value, $V_{out}$, step 414, then the feeding sequence is terminated, and the strip 26 is cut to form the receipt, step 415. However, should the value of $V_{out}$ not show a lesser correspondence with the predetermined $V_{black}$ value, then the strip 26 is advanced an additional increment, step 416. The system then determines whether the paper strip 26 has been advanced too far, step 417. If the answer is no, then step 413 is repeated via loop 418. If the answer is yes, then an error message is posted, step 419, stating that no black mark 29 has been found.

Figure 5:
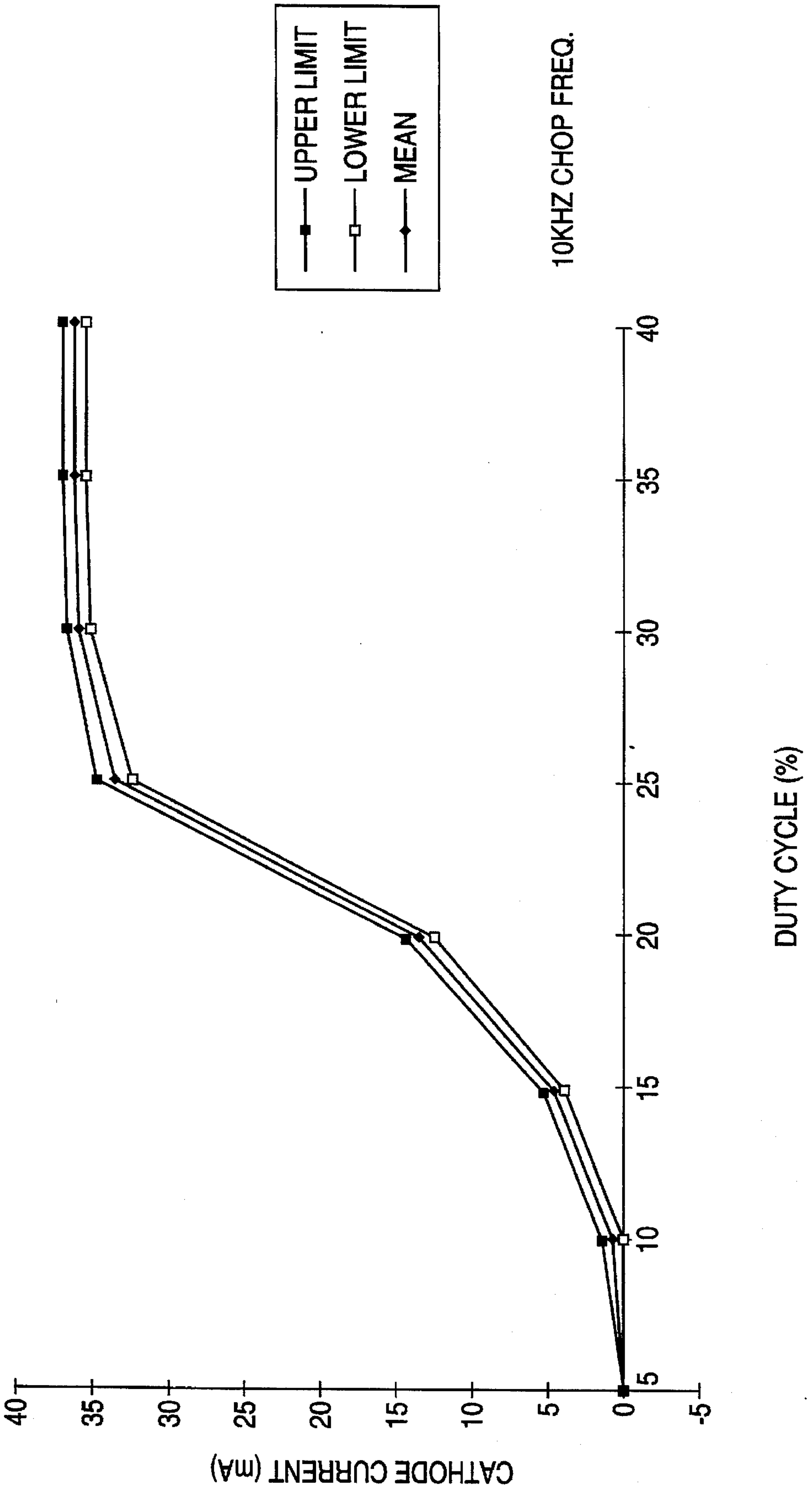
FIG. 5 depicts a graph of the cathode current of the LED versus the duty cycle programmed by the microprocessor, in accordance with the sensing system of FIGS. 1 and 2.

Referring to FIG. 5, a graph of cathode current (mA) versus duty cycle (in percentage) is illustrated. A pulse width portion of the duty cycle of above approximately 25% is sufficient to provide a maximum cathode current of 40 mA. Therefore, it is observed that the system is very fault-tolerant, and can accommodate supply rolls 28 having a wide range of optical characteristics.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A self-adjusting, optical-sensing system for providing an appropriate length for a receipt from a printer of a retail or financial machine, comprising:

light-emitting means electrically connected to a programmable microprocessor for emitting and directing a light beam towards a media strip having black marks periodically disposed along an edge thereof, said light beam being reflected from said media strip when a black mark is not present, said light beam being reflected towards a photo-sensor;

a photo-sensor in close proximity to said media strip and said light-emitting means, for sensing the reflected light beam from said media strip and providing a voltage signal indicative thereof, with said black mark substantially absorbing said light beam from said light-emitting means and thereby changing said voltage signal, which is then indicative of said media strip having advanced a length required to provide a receipt; and a programmable microprocessor electrically connected to said photo-sensor and said light-emitting means for producing a supply voltage for energizing said light-emitting means, and for receiving said voltage signal provided by said photo-sensor, with a calibration program contained in said microprocessor for assessing voltage signals generated by said photo-sensor when said media strip passes adjacent thereto, and with supply voltages required to be fed to said light-emitting means in order for said light-emitting means to direct said light beam towards said media strip, said calibration program providing a self-adjustment calibration by virtue of a relationship between said supply voltage fed to said light-emitting means under the control of said microprocessor and the voltage signal that is provided by said photo-sensor, said voltage signal influencing the control of said supply voltage by said microprocessor in accordance with said calibration program.

2. The self-adjusting, optical-sensing system in accordance with claim 1, wherein said light-emitting means comprises an infrared light-emitting diode (LED).

3. The self-adjusting, optical-sensing system in accordance with claim 1, wherein said photo-sensor comprises a photo-transistor.

4. The self-adjusting, optical-sensing system in accordance with claim 1, wherein said light-emitting means and said photo-sensor form part of an electrical circuit comprising an A/D converter and a D/A converter, said microprocessor having a pulse width modulator that feeds pulses to said D/A converter that, in turn, supplies said supply voltage to said light-emitting means, said photo-sensor being electrically connected to said A/D converter of said microprocessor and which supplies an input thereto, said voltage signal of said photo-sensor being filtered by said A/D converter and then processed by said microprocessor.

5. A self-adjusting, optical-sensing system for providing an appropriate length for a receipt from a printer of a retail or financial machine, comprising:

light-emitting means electrically connected to a programmable microprocessor for emitting and directing a light beam towards a media strip having black marks periodically disposed along an edge thereof, said light beam being reflected from said media strip when a black mark is not present, said light beam being reflected towards a photo-sensor;

a D/A converter electrically connected to said light-emitting means for supplying said light-emitting means with a supply voltage;

a photo-sensor in close proximity to said media strip and said light-emitting means, for sensing the reflected light beam from said media strip and providing a voltage signal indicative thereof, with said black mark substantially absorbing said light beam from said light-emitting means and thereby changing said voltage signal, which is then indicative of said media strip having advanced a length required to provide a receipt; and a programmable microprocessor comprising an A/D converter electrically connected to said photo-sensor for receiving said voltage signal from said photo-sensor, said programmable microprocessor being electrically connected to said D/A converter for receiving said input and for producing a supply voltage for energizing said light-emitting means, said input of said A/D converter being influenced by said voltage signal provided by said photo-sensor, with a calibration program contained in said microprocessor for assessing said input of said A/D converter when said media strip passes adjacent to said photo-sensor, and with supply voltages required to be fed to said light-emitting means by said D/A converter in order for said light-emitting means to direct said light beam towards said media strip, said calibration program providing a self-adjustment calibration by virtue of a relationship between said supply voltage fed to said light-emitting means under the control of said microprocessor and the voltage signal that is provided by said photo-sensor, said voltage signal influencing the control of said supply voltage by said microprocessor.

6. The self-adjusting, optical-sensing system in accordance with claim 5, wherein said light-emitting means comprises an infrared light-emitting diode (LED).

7. The self-adjusting, optical-sensing system in accordance with claim 5, wherein said photo-sensor comprises a photo-transistor.

8. The self-adjusting, optical-sensing system in accordance with claim 5, wherein said light-emitting means and said photo-sensor form part of an electrical circuit with said D/A converter, said microprocessor having a pulse width modulator that feeds pulses to said D/A converter that, in turn, supplies said supply voltage to said light-emitting means, said photo-sensor being electrically connected to said A/D converter of said microprocessor, said voltage signal of said photo-sensor being filtered by said A/D converter and becoming part of said input that is then processed by said microprocessor.

9. A method of automatically calibrating the photo-sensing of a media strip having black marks periodically disposed along an edge thereof, said media strip being advanced through a printer of a financial or retail machine until a black mark is sensed, wherein said media strip is cut to provide a receipt, said method comprising the steps of:

a) sampling a first voltage corresponding to sensed ambient-light conditions;

b) sampling a second voltage corresponding to an output voltage of a photo-reflective device sensing a media strip;

c) determining a value representative of a threshold voltage being supplied to said photo-reflective device;

d) subtracting said first voltage of step (a) from said second voltage of step (b), and comparing the difference voltage value with said threshold voltage value determined in step (c); and e) storing said threshold voltage value in memory, said threshold voltage value corresponding to a voltage calibration value when said difference voltage value of step (d) is greater than said threshold voltage value of step (c).

10. The method of automatically calibrating the photo-sensing of a media strip in accordance with claim 9, wherein said threshold voltage value of step (c) is iteratively determined.

11. The method of automatically calibrating the photo-sensing of a media strip in accordance with claim 9, further comprising the steps of:

f) incrementally advancing said media strip through a printing device in accordance with the stored voltage threshold value of step (e);

g) sensing a black mark on said media strip;

h) determining a voltage value for said black mark; and i) comparing said voltage value sensed for said black mark with a predetermined voltage value for said black mark, whereby if said predetermined voltage value of said black mark is greater than said sensed voltage value of said black mark, then the incremental advancement of said media strip is halted and a receipt provided.

12. A method of automatically calibrating the photo-sensing of a media strip having black marks periodically disposed along an edge thereof, said media strip being advanced through a printer of a financial or retail machine until a black mark is sensed, wherein said media strip is cut to provide a receipt, said method comprising the steps of:

a) sampling a voltage corresponding to an output voltage of a photo-reflective device sensing a media strip;

b) nulling a portion of said output voltage in accordance with step (a), said portion corresponding to ambient light, in order to provide a first voltage value;

c) determining a value representative of a threshold voltage being supplied to said photo-reflective device;

d) comparing said first voltage value of step (b) with said threshold voltage value determined in step (c), to produce a difference voltage;

e) storing said threshold voltage value in memory, said threshold voltage value corresponding to a voltage calibration value when said difference voltage value of step (d) is greater than said threshold voltage value of step (c).

13. The method of automatically calibrating the photo-sensing of a media strip in accordance with claim 12, wherein said threshold voltage value of step (c) is iteratively determined.

14. The method of automatically calibrating the photo-sensing of a media strip in accordance with claim 12, further comprising the steps of:

f) incrementally advancing said media strip through a printing device in accordance with said stored voltage threshold value of step (e);

g) sensing a black mark on said media strip;

h) determining a voltage value for said black mark; and i) comparing said voltage value sensed for said black mark with a predetermined voltage value for said black mark, whereby if said predetermined voltage value of said black mark is greater than said sensed voltage value of said black mark, then the incremental advancement of said media strip is halted and a receipt provided.

15. A method of calibrating a sensing system for dispensing receipts from a printing machine, comprising the steps of:

a) after assuming that a photo-sensing device is seeing white paper, iteratively increasing a voltage supply signal for energizing a light-emitting device having a beam that is reflected from a media strip towards said photo-sensing device, while measuring a voltage output corresponding to said photo-sensing device;

b) determining whether said voltage output of said photo-sensing device has reached a maximum value before the voltage supply signal for said light-emitting device has reached a given, predetermined threshold value; and c) if the voltage output has reached a maximum value before the voltage supply signal has reached said predetermined threshold value, then choosing another threshold value that is representative of a reliable white-paper signal.

16. The method of calibrating a sensing system for dispensing receipts from a printing machine in accordance with claim 15, wherein steps (a) through (c) are repeated until a reliable calibrating signal is obtained.

* * * * *